Sept. 2, 1952  G. G. HEBARD  2,609,001
SURGE ABSORBING CHAMBER
Filed June 13, 1947  2 SHEETS—SHEET 1
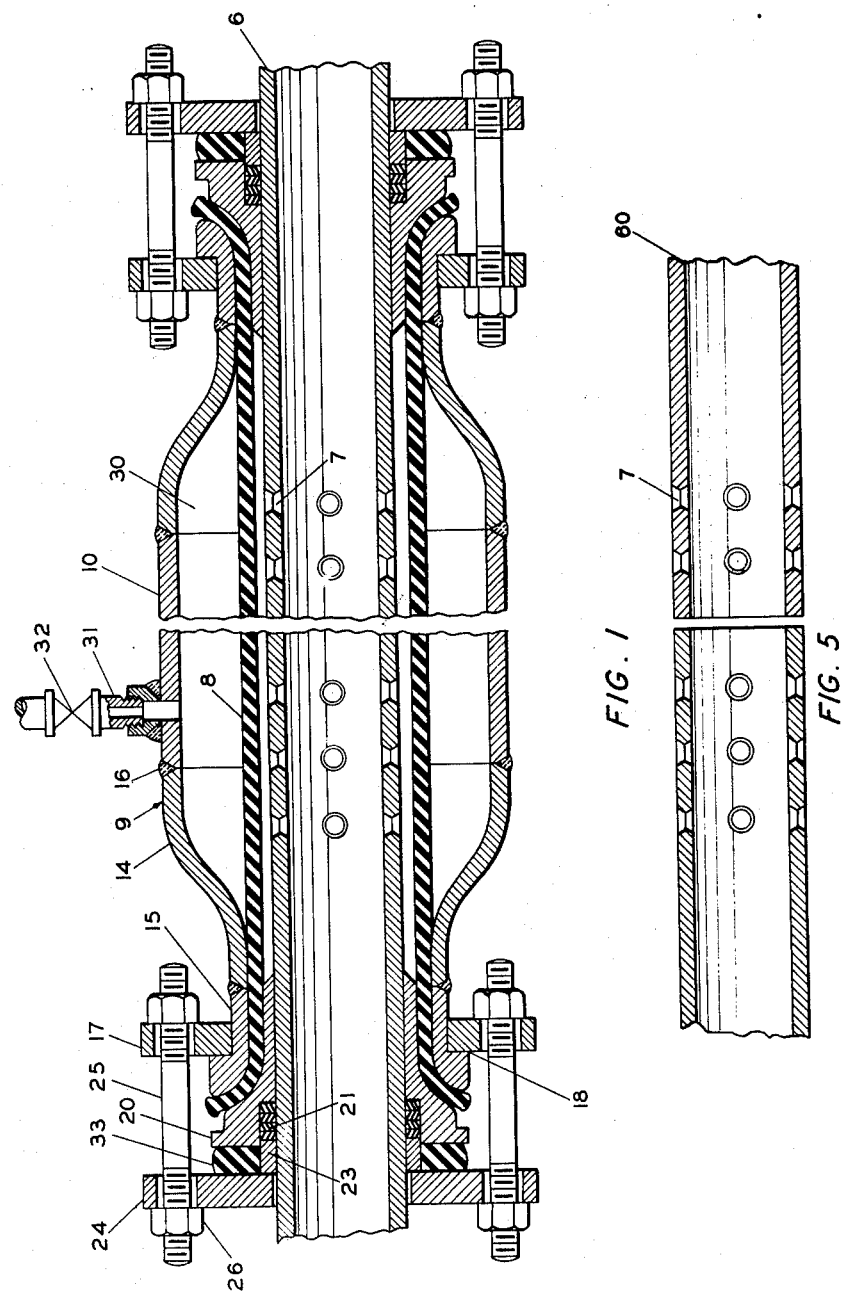
INVENTOR.
G. G. HEBARD
BY Hudson and Young
ATTORNEYS

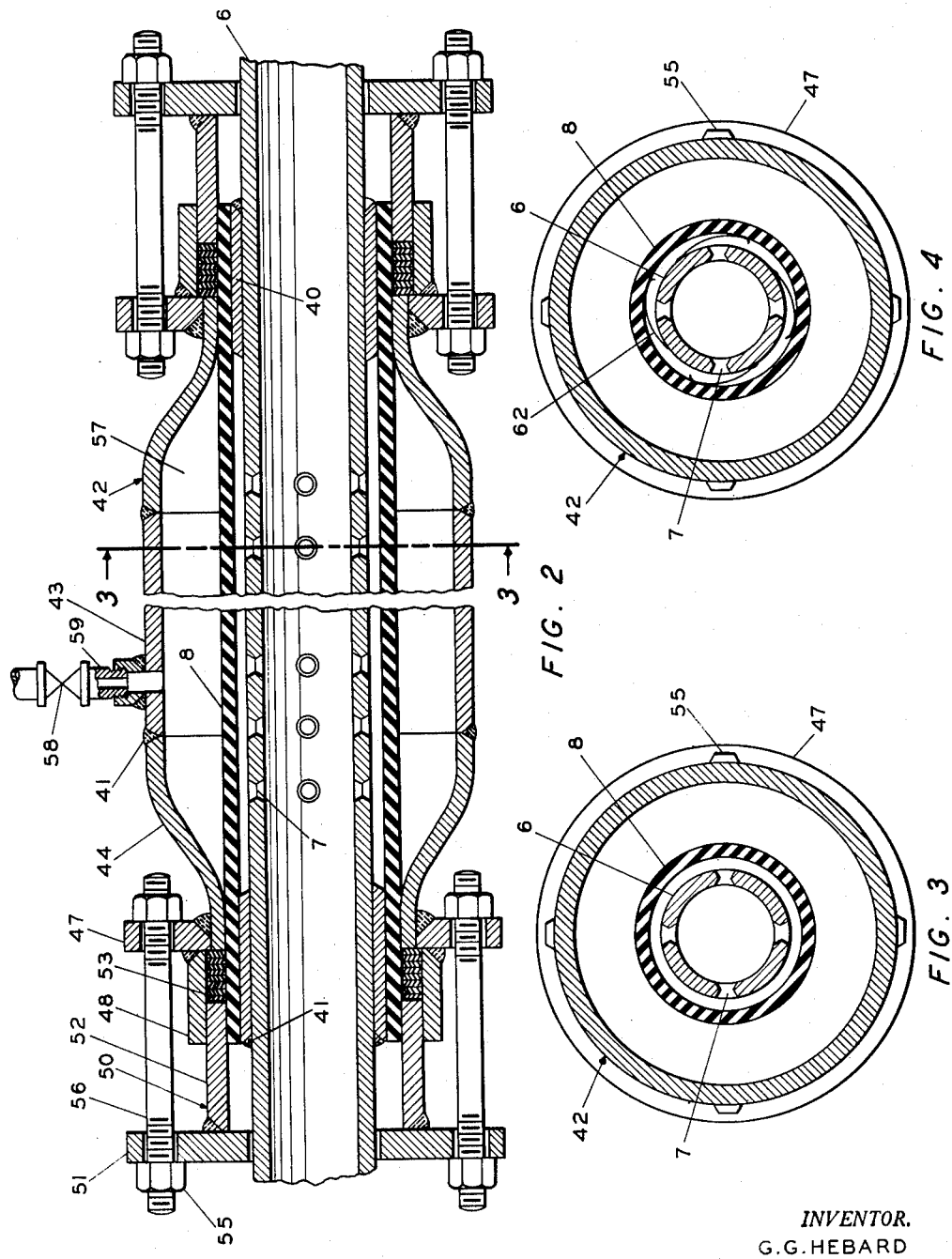

Patented Sept. 2, 1952

2,609,001

UNITED STATES PATENT OFFICE 2,609,001

SURGE ABSORBING CHAMBER

Glen G. Hebard, Bartlesville, Okla., assignor to Phillips Petroleum Company, a corporation of Delaware Application June 13, 1947, Serial No. 754,554

2 Claims. (Cl. 138—26)

This invention relates to surge-absorbing chambers. In one of its more specific aspects, it relates to improvements in gaseously pre-charged surge-absorbing chambers.

As it is well known in the case of the myriad forms of reciprocatory and many other types of pumps, the flow from such a pump tends to surge with the stroke of said pump and recedes again to await the next stroke. This type of operation has placed undue strain upon pipe systems due to excessively high pressures developed during surges and abnormally low pressures intermediate surges together with vibrations caused thereby. The result has been that much attention has been focused on the program of developing a suitable apparatus which will substantially cause pressures of flow from such pumps to level off and reduce vibrations.

An object of my invention is to provide a device which will, when communicating with a flow line, effectively absorb excessive pressure, augment abnormally low pressures and thus protect the flow line for shock due to variations in pressure.

Another object of my invention is to provide a device of such construction that a gas may be utilized as a dampening agent to absorb the shock.

A still further object of my invention is to provide a combination surge absorbing and pipe coupling device.

Other objects and advantages will be apparent from a study of the accompanying disclosure and drawing.

Figure 1 is a longitudinal transverse cross-sectional view of a device embodying the preferred construction of the invention.

Figure 2 is a longitudinal transverse cross-sectional view of a device embodying a modification of my invention.

Figure 3 is a cross-sectional view taken along the 3—3 line of Figure 2.

Figure 4 is a cross-sectional view similar to Figure 3 and embodying another modification of the invention.

Figure 5 is a cross-sectional view showing another modification of the invention.

In Figure 1, pipe 6 forms a portion of a flow line and has a cross-sectional area substantially equal to that of the flow line. Pipe 6 is provided with perforations 7 in its walls in a section thereof. These perforations provide communication between the interior and exterior of said pipe and are preferably beveled on the inner and outer sides of the pipe. They may be arranged in 4 rows 90° apart. The combined area of the perforations may be varied, but in most cases should equal or exceed the cross-sectional area of pipe 6. A resilient sleeve such as rubber sleeve 8, having an inner diameter substantially larger than the exterior diameter of the perforate portion of pipe 6, is slipped over pipe 6 so as to cover the perforate portion thereof and to extend beyond each end of the perforate section for a considerable space. The ratio between the inner diameter of said resilient sleeve and the exterior diameter of the perforate portion of pipe 6 should be within the range of from 1.1:1 to 1.5:1 though the sizes are not limited to this ratio. Outer shell 9 comprises an intermediate enlarged section 10 and sub-intermediate sections 14 which have enlarged inner end portions which are smoothly expanded and belled from their outer end portions to substantially the diameter of intermediate enlarged section 10 and small ends having an interior diameter substantially the same as or slightly larger than the exterior of rubber sleeve 8, and outer end sections 15 having an interior diameter substantially the same as the interior diameter of the outer ends of sub-intermediate sections 14. The interiors of sections 15 are belled on their outer ends. These sections may be secured together in any conventional manner so as to make a gas-tight, smooth connection, but as shown on Figure 1 of the drawing, it is preferred to make the connections by welds 16. It is important that the interior of outer shell 9 be smooth to prevent tearing of or damage to rubber sleeve 8 during surges. Before securing end sections 15 to sub-intermediate sections 14 slip-on flanges 17 are slipped over the inner ends of sections 15 and are slipped outwardly until they contact square shoulders 18 on the ends of sections 15. Flanges 17 are supplied with bolt holes intermediate their inner and outer peripheries. Spacer sleeves 20 have inner diameters but slightly larger than the exterior diameter of pipe 6. They also have progressively larger exterior diameters from inner to outer ends, and tapering outwardly so that the small ends thereof are but slightly smaller and the large ends are substantially larger than the interior diameter of rubber sleeve 8. These spacer sleeves are slipped over pipe 6 so that the small ends of said sleeves fit within rubber sleeve 8. Rubber sleeve 8 is caused to expand at its ends by the conical shape of said spacer sleeves so that rubber sleeve 8 is, in its expansion, held against the belled end of outer shell 9 by tapered sleeve 20. A portion of the outer end of each sleeve 20 is recessed so that it is substantially larger in interior diameter than the exterior diameter of pipe 6 and so that a stuffing box is formed by those sections of sleeves 20 and pipe 6. Packing material such as rubber packing rings 21 is slipped over the ends of pipe 6 and into the stuffing box formed by the recessed portions of sleeves 20. Annular rings 23, having slightly larger interior diameters than the exterior diameter of pipe 6 and slightly smaller exterior diameters than the interior diameter of the recessed ends of sleeves 20, are slipped over pipe 6 and into the stuffing boxes. Slip-on flanges 24, being supplied with bolt holes intermediate their inner and outer peripheries and having interior diameters slightly larger than the exterior diameter of pipe 6 are slipped over the ends of pipe 6 and are brought against annular rings 23 to form follower means. The bolt holes in flanges 17 and 24 are matched so that rods 25, threaded on either end, may be slipped therethrough and nuts 26 screwed thereon so as to force flanges 24 toward flanges 17. In this manner annular rings 23 are forced into the stuffing boxes thus compressing packing rings 21 to form a gas-tight seal between pipe 6 and sleeves 20. Sleeves 20 are forced inwardly by pressure from flanges 24, rings 23 and packing rings 21 so as to compress rubber sleeve 8 between sections 15 and sleeves 20, thus forming another gas-tight seal and making a gas-tight chamber 30 between outer shell 9 and rubber sleeve 8. Communication is had between chamber 30 and the exterior of said chamber through conduit 31 and valve 32. Any packing material 33, preferably rubber packing, may be placed around annular rings 23 so as to prevent the outer surface of rings 23 from collecting dirt and corrosion thereon which would make it difficult for said rings to act as followers or compressors in the stuffing boxes. Such packing material also furnishes a broader surface against which flanges 24 may press to move sleeves 20. A gas is charged through valve 32 and conduit 31 to gas chamber 30 at a pressure in excess of the normal pressure of the flow line. Any substantially non-corrosive gas may be used though I prefer to use an inert gas such as nitrogen or carbon dioxide. Gases of the helium group of the periodic table may well be used to charge chamber 30 as also may air or natural or field gas. I further prefer to use oxidation inhibitors as disclosed by Wolk in U. S. Patent 2,363,717, in combination with such gas charge, to substantially reduce deterioration of the rubber sleeve. Rubber sleeve 8 may be made of any resilient or rubber-like material but it is preferred to use butyl rubber which is less porous and quite resistant to the escape of gases therethrough.

In Figure 2 pipe 6 is similar to that of Figure 1, having a similar perforate portion with perforations 7 therein. A resilient sleeve, such as rubber sleeve 8, is likewise similar to that of Figure 1. Spacer sleeves 40 are slipped over pipe 6 and under rubber sleeve 8 at points beyond each end of the perforate portion of pipe 6 so that the ends of rubber sleeve 8 are fitted snugly to the exterior of sleeves 40 and the intermediate section of rubber sleeve 8 between spacer sleeves 40 is spaced from pipe 6. Spacer sleeves 40 may be fastened to pipe 6 in any conventional manner so as to form a gas-tight connection therebetween. As shown in Figure 2 at 41, I prefer to weld these sleeves in place. Outer shell 42 comprises an intermediate section 43 which is considerably larger in inner diameter than the outer diameter of rubber sleeve 8. The end sections 44 of outer shell 42 are so constructed that the inner ends are substantially the same size as intermediate section 43 and the interior diameter of the outer ends is substantially the same or very slightly larger than the exterior diameter of rubber sleeve 8. This outer shell may be constructed in any convenient manner. One suitable method of construction is to utilize a large piece of pipe as the enlarged intermediate section and use, for ends, swage nipples. These sections may be secured together in any conventional manner so as to form smooth, gas-tight connections. Once again, as shown in Figure 2, I prefer a welded connection. Outer shell 42 is sufficiently long that when it is fitted over rubber sleeve 8 the constricted ends thereof fit over sections of rubber sleeve 8, which sections cover the inner ends of spacer sleeves 40. Slip-on flanges 47 are placed over the small ends of sections 44 and are secured thereto in any conventional manner, preferably by welding. Stuffing boxes are formed by attaching to flanges 47 annular rings 48 which are of substantially larger inner diameters than the outer diameter of rubber sleeve 8. Followers 50 are formed by slip-on flanges 51 and annular rings 52 which rings are attached in any conventional manner to flanges 51. Flanges 51 and flanges 47 are preferably supplied with bolt holes intermediate their inner and outer peripheries. Packing material such as rubber packing rings 53 is placed in the stuffing boxes and followers 51 are drawn toward flanges 47 by tightening nuts 55 on threaded rods 56. Annular rings 52 are preferably machined so that their inner diameters are but slightly larger than the exterior diameter of rubber sleeve 8 and the exterior diameters of said rings are but slightly smaller than the interior diameter of rings 48. By drawing the followers toward flanges 47, packing material 53 is compressed forming a gas-tight seal and a gas-tight chamber 57 between outer shell 42 and rubber sleeve 8. At the same time packing material 53 compresses rubber sleeve 8 against spacer sleeves 40 to form a second gas-tight seal. Gas such as disclosed above is charged to chamber 57 through valve 58 and conduit 59.

In Figure 4 another modification of the invention is shown wherein springs 62 are attached to pipe 6 within rubber sleeve 8 so as to resist compression of sleeve 8 against pipe 6 and into perforations 7.

In the operation of the surge-absorbing chamber as shown in Figures 1 and 2 of the drawing the gas pre-charge within gas chambers such as 30 and 57 cause the resilient sleeve to be compressed against pipe 6 or springs 62, so that it is slightly extended, or stretched, inwardly. As fluid surges within the flow line and/or pipe 6 it moves through perforations 7 to force the resilient sleeve outwardly into its normal position and cause some compression of the gas pre-charge. As stronger surges occur the resilient sleeve will be expanded outwardly, thus causing further compression of the gas pre-charge in chambers 30 and 57 which will substantially absorb the shock of such surges. As the crest of a surge passes, the compressed gas will force the resilient sleeve inwardly toward pipe 6, thus adding pressure to the flow line and tending to even off said flow line pressure thereby.

As described above, this surge absorbing chamber is utilized as an in-line chamber. Its operation, however, is equally as satisfactory when utilized as a T or dead-end chamber. In such usage, one end of pipe 6 is capped or plugged while the other end communicates with a flow line.

It is obvious that a spacer may be made in other ways than those described for spacer sleeves 20 and 40. Pipe 6 could be machined on the outside so as to have a smaller outer diameter the length of the perforate section thus making possible the spacing between rubber sleeve 8 and pipe 6. By spacing the rubber sleeve away from the perforate section of pipe 6 and pre-charging chambers 30 or 57 so as to compress rubber sleeve 8 against pipe 6 it is obvious that less expansion will be required of rubber sleeve 8 to absorb the surges of flow than would be necessary if the rubber sleeve were fitted coincident to the surface of the perforate section.

Still another modification in the construction and use of this device is possible where it is desired to save the cost of making an extra joint in a pipe. This form of surge-absorbing chamber may be so installed as to perform its surge-absorbing function and also form a pipe coupling between two anchored or rigid sections of flow line. Let us suppose that pipe 6 of Figures 1 or 2 is actually in two sections as shown by pipe 60 in Figure 5, which sections make a butt joint somewhere within the broken section of the figures. This chamber may be installed by prying the two sections of pipe 60 out of line far enough to slip the chamber over one section, lining up the two sections once more and slipping the chamber partially back over the second section of pipe 60. In this installation, the gap between the sections of pipe 60 will serve the same function as holes 7. It will thus be seen that when the resilient sleeve has been compressed to make the gas-tight seal for the surge chamber the surge chamber also makes a joint for the two sections of pipe 60.

Other modifications obviously can be made without departing from the spirit or teachings of the disclosure or from the scope of the claims.

I claim:

1. A surge absorbing chamber for a flow line comprising in combination a section of said flow line, a portion of said section of flow line being perforate; a resilient sleeve surrounding and extending beyond the ends of said perforate portion of said flow line and having an interior diameter substantially greater than the exterior of the perforate portion of said flow line; means to space the ends of said resilient sleeve from said flow line; an outer shell enlarged intermediate its ends to form a chamber surrounding said resilient sleeve; means to hermetically seal said chamber surrounding said resilient sleeve, and the space between said resilient sleeve and said flow line; means to charge said chamber with a gas under pressure; and means to prevent the pressing of said resilient sleeve against the perforate portion of said flow line.

2. A surge absorbing chamber for a flow line comprising in combination at least one section of said flow line, a portion of each said section being perforate and the combined area of said perforations in said flow line being at least equal to the cross-sectional area of said flow line; a resilient sleeve surrounding and extending beyond the ends of said perforate portion of said flow line, the ratio between the inner diameter of said sleeve and the outer diameter of the perforate portion of said flow line being within the range of from 1.1:1 to 1.5:1; means to space said resilient sleeve from said perforate portion of said flow line; an imperforate outer shell smoothly belled and expanded from its outer ends so as to form a smooth inner-surfaced chamber surrounding said resilient sleeve and forming the sole structural circumferential restraining means for said resilient sleeve; means to hermetically seal said chamber surrounding said resilient sleeve, and the space between said resilient sleeve and said flow line; spring means to prevent the pressing of said resilient sleeve against the perforate portion of said flow line; and means to charge said chamber with a gas under pressure.

GLEN G. HEBARD.

REFERENCES CITED

The following references are of record in the file of this patent:

UNITED STATES PATENTS

| Number | Name | Date |
| --- | --- | --- |
| 2,278,688 | Caminz | Apr. 7, 1942 |
| 2,290,337 | Knautt | July 21, 1942 |
| 2,448,118 | Pellettere | Aug. 31, 1948 |
| 2,495,693 | Byrd et al. | Jan. 31, 1950 |